(12) United States Patent
Fatato et al.

(10) Patent No.: US 7,449,079 B2
(45) Date of Patent: Nov. 11, 2008

(54) LINK BELT ASSEMBLY AND METHOD FOR PRODUCING SAME

(75) Inventors: Francis B Fatato, Exton, PA (US); Jeremy M Bigler, Landisville, PA (US)

(73) Assignee: Fenner, U.S., Inc., Manheim, PA (US)

( * ) Notice: Subject to any disclaimer, the term of this patent is extended or adjusted under 35 U.S.C. 154(b) by 309 days.

(21) Appl. No.: 11/277,301

(22) Filed: Mar. 23, 2006

(65) Prior Publication Data

US 2006/0201789 A1 Sep. 14, 2006

Related U.S. Application Data

(63) Continuation-in-part of application No. 10/978,682, filed on Nov. 1, 2004, now Pat. No. 7,241,354, which is a continuation-in-part of application No. 10/767,954, filed on Jan. 29, 2004, now Pat. No. 7,004,311.

(60) Provisional application No. 60/443,891, filed on Jan. 31, 2003, provisional application No. 60/664,811, filed on Mar. 24, 2005.

(51) Int. Cl.
    *B65G 15/00* (2006.01)
(52) U.S. Cl. .................. 156/137; 156/266; 198/850; 83/13
(58) Field of Classification Search .......... 198/850, 198/853; 474/264, 266; 156/137, 266, 324, 156/292; 83/13, 14
    See application file for complete search history.

(56) References Cited

U.S. PATENT DOCUMENTS

| 72,181 A | 12/1867 | Fountain |
|---|---|---|
| 1,177,664 A | 4/1916 | Vuilleumier |
| 1,182,933 A | 5/1916 | Schulte |
| 1,438,566 A | 12/1922 | Wiggins |
| 1,519,165 A | 12/1924 | Pilliner |
| 2,969,686 A | 1/1961 | Runton |
| 3,154,960 A * | 11/1964 | Creswell .............. 474/241 |
| 3,154,961 A | 11/1964 | Creswell |
| 3,269,523 A * | 8/1966 | Creswell .............. 198/618 |
| 3,288,273 A | 11/1966 | Michaelson et al. |
| 3,345,113 A | 10/1967 | Siber |
| 3,387,500 A | 6/1968 | Hutzenlaub et al. |
| 3,418,862 A | 12/1968 | Hurbis |
| 3,857,478 A | 12/1974 | Meeusen |
| 3,991,632 A | 11/1976 | Stephens |

(Continued)

FOREIGN PATENT DOCUMENTS

JP 59-97345 4/1984

*Primary Examiner*—James R Bidwell
(74) *Attorney, Agent, or Firm*—Stephen H. Eland; Dann, Dorfman, Herrell & Skillman

(57) ABSTRACT

A belt for power transmission and for conveying elements is provided wherein the belt comprises a top layer attached to the top surface of the belt. The top layer provides a generally smooth top surface for the belt. The belt preferably is a link belt and the top surface of the belt comprises a bonding layer for adhering the top layer to the belt. The bonding layer may be a thermoplastic urethane that is heat fusible with the compressible layer to adhere the compressible layer to the belt. A method is also provide in which a top layer is adhered to a link belt and the top layer is then severed into a plurality of separate elements.

18 Claims, 3 Drawing Sheets

U.S. PATENT DOCUMENTS

| | | |
|---|---|---|
| 4,015,038 A | 3/1977 | Romanski et al. |
| 4,028,956 A | 6/1977 | Thompson |
| 4,055,265 A | 10/1977 | Eiserman |
| 4,377,365 A | 3/1983 | Layh |
| 4,458,809 A | 7/1984 | White et al. |
| 4,550,823 A | 11/1985 | Gladish |
| 4,588,073 A | 5/1986 | Abell |
| 4,675,229 A | 6/1987 | Westhead |
| 4,688,615 A | 8/1987 | Lee |
| 4,903,824 A | 2/1990 | Takahashi |
| 4,922,304 A | 5/1990 | Gilbert et al. |
| 4,925,013 A | 5/1990 | Lapeyre |
| 4,957,199 A | 9/1990 | Wokke et al. |
| 5,011,003 A | 4/1991 | Gladding |
| 5,176,246 A | 1/1993 | Wiggers et al. |
| 5,332,786 A | 7/1994 | Nagata et al. |
| 5,361,893 A | 11/1994 | Lapeyre et al. |
| 5,507,383 A | 4/1996 | Lapyere et al. |
| 5,564,558 A | 10/1996 | Hampton et al. |
| 5,582,287 A | 12/1996 | Heit et al. |
| 5,658,634 A | 8/1997 | Ragland et al. |
| 5,667,058 A | 9/1997 | Bonnet |
| 5,853,849 A | 12/1998 | Nishio et al. |
| 5,984,082 A | 11/1999 | Geib |
| 6,062,379 A | 5/2000 | Geib et al. |
| 6,173,831 B1 | 1/2001 | Grabscheid et al. |
| 6,565,689 B2 | 5/2003 | Geib et al. |
| 6,770,004 B1 | 8/2004 | Lofgren et al. |
| 7,004,311 B2 | 2/2006 | Fatato et al. |
| 7,214,354 B2 * | 5/2007 | Ongaro .................. 422/298 |

\* cited by examiner

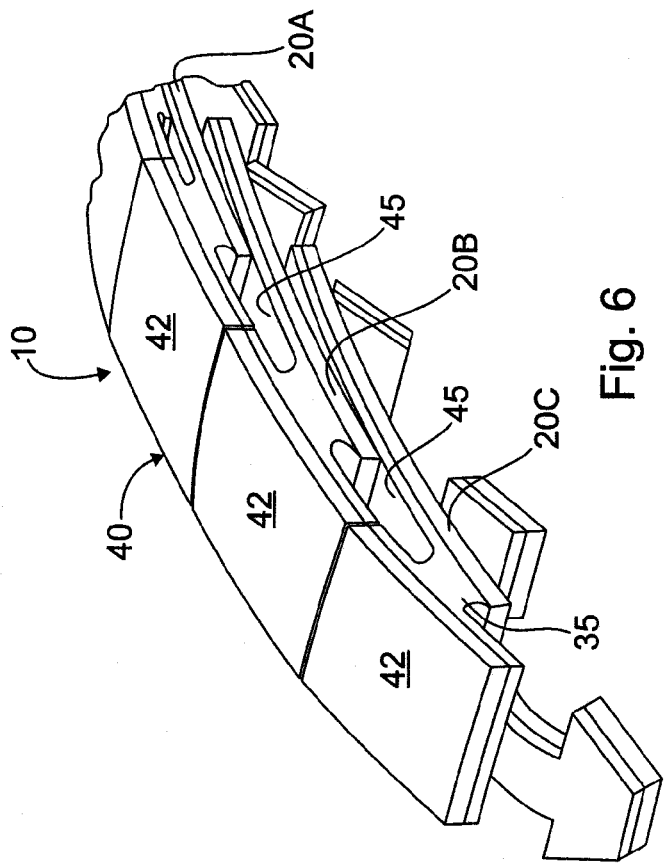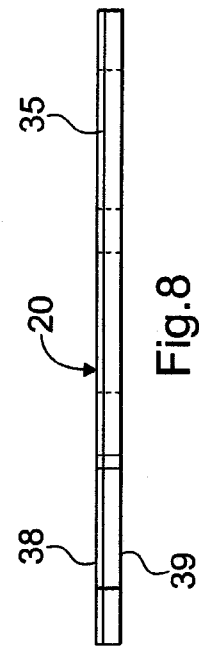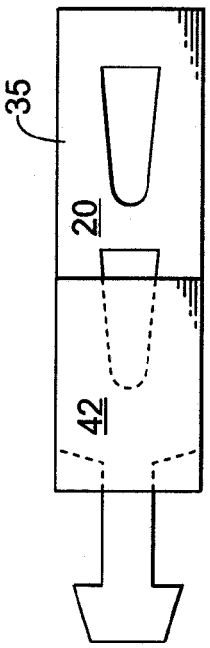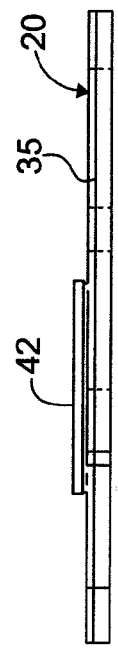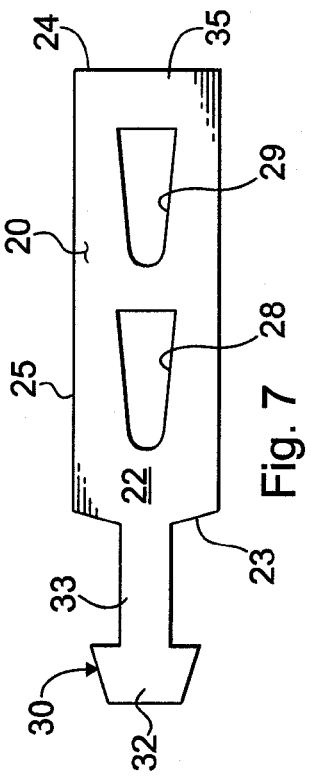

LINK BELT ASSEMBLY AND METHOD FOR PRODUCING SAME

RELATED APPLICATIONS

The present application is a continuation-in-part of U.S. patent application Ser. No. 10/978,682, filed Nov. 1, 2004 now U.S. Pat. No. 7,241,354, which is a continuation-in-part of U.S. patent application Ser. No. 10/767,954, filed Jan. 29, 2004, now U.S. Pat. No. 7,004,311 which claims priority to U.S. Provisional Patent Application No. 60/443,891, filed Jan. 31, 2003. The present application also claims priority to U.S. Provisional Patent Application No. 60/664,811, filed Mar. 24, 2005. Each of the foregoing applications is hereby incorporated herein by reference.

FIELD OF THE INVENTION

The present invention relates to interlocking-link conveyor belts and has particular use in applications in which it is desirable to have a flat surface to convey products. The present invention also relates to applications in which the top surface of an interlocking-link belt is used for power transmission.

BACKGROUND OF THE INVENTION AND DISCUSSION OF PRIOR ART

Link belts are generally known and used in a variety of applications, such as transmission belts and conveyor belts. Unlike typical continuous belts, the upper surface of a link belt is defined by a series of transitions between the adjacent links. Therefore, the upper surface of the link belt is not generally flat. In many applications, the surface transitions between belt links do not create a problem. However, in certain instances the upper surface of the belt may engage a machine element to drive the element. The interface between the machine element and the surface transitions on the belt leads to undesirable noise and/or vibrations. The vibrations can lead to accelerated wear of various components of the conveyor assembly. In addition, the significant noise produced degrades the work place environment and introduces dangers associated with high-noise environments.

SUMMARY OF THE PREFERRED EMBODIMENTS

Accordingly, the present invention provides a link belt configured to overcome one or more of the shortcomings of the known belts so that the belt can be used in a variety of applications. For instance, according to one aspect, a link belt having a generally smooth upper surface is provided.

According to one embodiment, the smooth surface may be provided by attaching one or more elements to the top surface of the belt after the belt links are connected together to form a length of belt. More specifically, a length of a generally flat material may be attached to the top surface of the link belt so that the flat material forms the upper surface of the belt.

According to another aspect, a link belt having elements attached to the top surface is provided wherein the link belt can be readily separated and reconnected along the length of the belt.

In accordance with one embodiment, the elements attached to the top surface of the link belt may be configured and attached to the belt links so that the belt links may be detached from one another without detaching the elements attached to the top surface of the belt. Optionally, the top elements may be attached to the link belt such that each top element is only attached to a single belt link.

According to yet another aspect, a link belt having noise reducing elements is provided wherein the belt has a low profile.

In accordance with one embodiment, the noise reducing elements may be generally flat elements having a thickness that is less than the thickness of the belt links. Optionally, the noise reducing elements may be attached to the top of the link belt by adhering the noise reducing elements directly to the top surface of the belt.

In light of the foregoing, a link belt is formed of a plurality of overlapping interlocking belt links is provided. The link belt includes an elongated top layer overlying the link belt, wherein the top layer is attached to the link belt and has a thickness that is less than the thickness of the belt links.

In addition, a method for forming a belt is also provided. The method includes the step of providing a link belt formed of a plurality of individual belt links and attaching a top layer to the top surface of the link belt. Subsequently, the top layer is severed to provide a plurality of separate top layer elements attached to the top surface of the link belt.

BRIEF DESCRIPTION OF THE DRAWINGS

FIG. 4 is a top view of an individual link of the belt shown in FIG. 1.

FIG. 5 is a side view of the individual belt link shown in FIG. 4.

FIG. 6 is a perspective view of a portion of the belt illustrated in FIG. 1.

FIG. 7 is a top view of the individual link shown in FIG. 4, without an attached top layer element.

FIG. 8 is a side view of the individual belt link shown in FIG. 7.

DETAILED DESCRIPTION OF THE PREFERRED EMBODIMENTS

Figure 1:
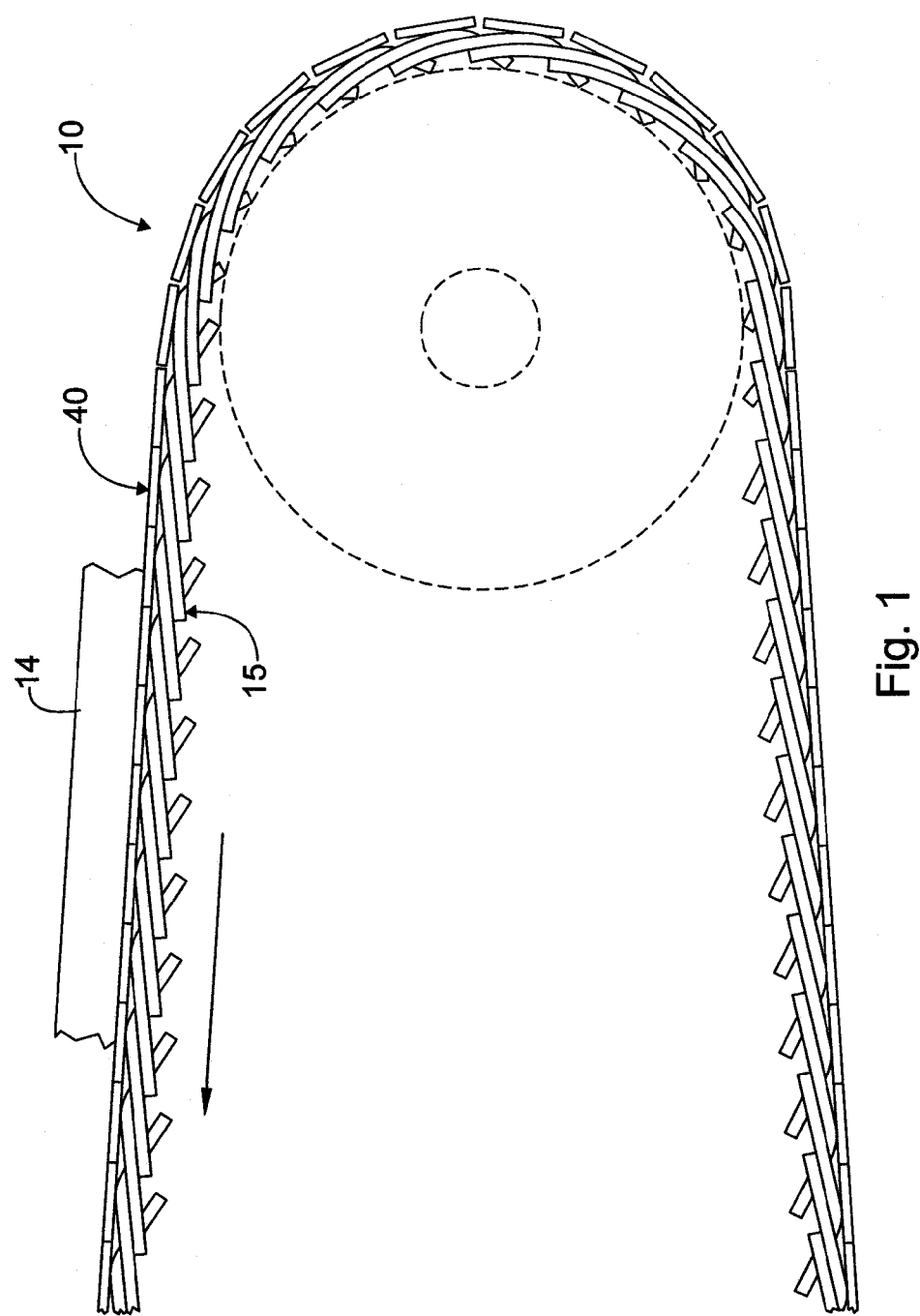
FIG. 1 is a side view of an interlocking-link conveyor assembly having a generally flat top surface shown transporting a workpiece and engaged by a driving mechanism for the assembly.

Referring now to the drawings in general and FIG. 1 specifically, the preferred embodiment of a conveyor assembly designated generally 10, which comprises a belt 15 having a top layer 40. The assembly 10 is shown transporting a workpiece 14. When the workpiece is placed on the conveyor assembly 10, the top layer 40 engages the workpiece. The top layer 40 preferably provides a flat top surface between the workpiece and the conveyor assembly 10.

In a preferred embodiment, the belt 10 is a link belt having a top surface that forms a bonding surface 35. Preferably, after the link belt 15 is formed, the top layer 40 is then bonded to the bonding surface 35 of the link belt.

The top layer 40 is preferably a smoothing layer that provides a generally flat top surface that over lies the length of the belt. In other words, the top layer operates as a smoothing element so that the top surface of the conveyor assembly 10 is generally flat. In this way, when a workpiece is placed on the belt, it is placed onto the smoothing layer 40. Alternatively, when used in a power transmission application, the smoothing layer 40 is used as a drive surface to engage and drive cooperating elements. For example, in one application, the belt can be used to drive the rollers in a skate roller bed. The smoothing layer 40 frictionally engages the rollers to drive the rollers.

Figure 2:
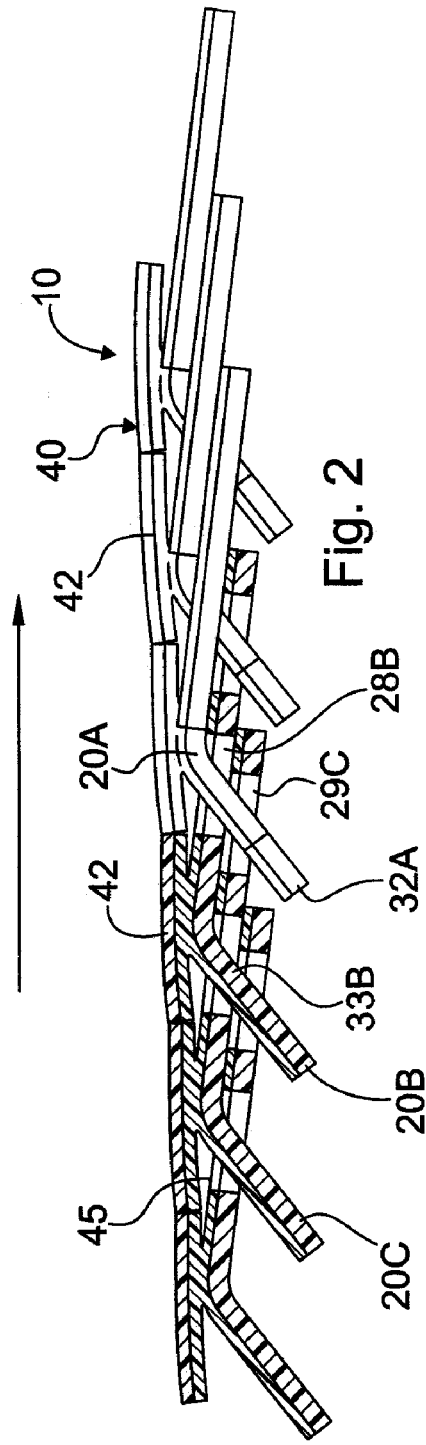
FIG. 2 is a fragmentary side view partially in section, of the belt shown in FIG. 1.
Figure 3:
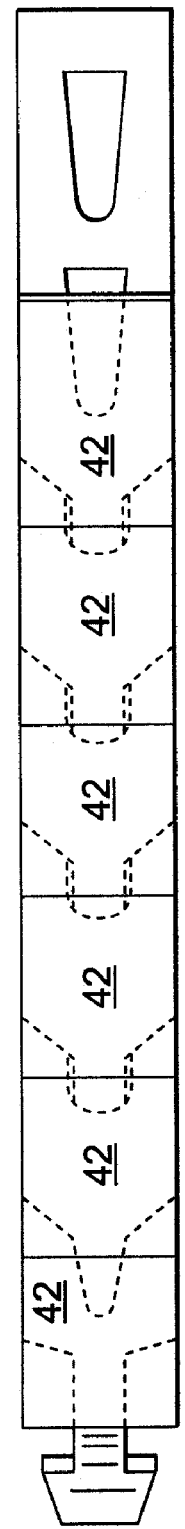
FIG. 3 is a plan view of the belt shown in FIG. 2.

Referring now to FIGS. 1-3, the belt 15 preferably comprises a series of interlocking belt links 20. One of the individual links 20 that comprise belt 15 is illustrated in FIGS. 7 and 8. Each belt link 20 has a body portion 22 and a fastener 30 connected to the body portion. In the present instance, the thickness of the belt link 20 between the top surface 38 and the bottom surface 39 is substantially uniform throughout the entire link.

A bonding material is permanently bonded to the top surface of each belt link 20. The bonding material forms a bonding surface 35 that is coextensive with the top surface of the belt link 20. Preferably, the bonding surface 35 is approximately 1 mm or less.

The body portion 22 of the belt link 20 is generally rectangular, having two edges 25 extending longitudinally between a leading end 24 and a trailing end 23, both of which extend transversely between the two edges. Adjacent leading end 24 a leading aperture 29 extends through the thickness of body portion 22. Longitudinally spaced from the leading aperture 29 adjacent the trailing end 23, a trailing aperture 28 extends through the thickness of body portion 22.

The leading end 24 corresponds to the direction in which the assembly 10 travels as shown by the arrow in FIG. 1. However, the direction in which the assembly 10 travels can be reversed so that the leading end 24 does not lead the trailing end 23 with respect to the actual travel of the assembly.

The fastener 30 integrally connects the body portion 22, and comprises a fastening tab 32 and a constricted neck 33. The neck extends longitudinally, with one end connected to the fastening tab 32, and the other end connected to the trailing end 23 of body 22. The length of the neck 33 between the trailing end 23 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links can properly connect, the apertures are configured and dimensioned with reference to the fastening tab and the neck.

In the present instance, the apertures through body 22 are non-circular. Both apertures 28 and 29 are longitudinally elongated so that their length 26 is greater than their width. To ensure that fastening tab 32 can pass through the apertures, the length of the apertures is greater than the greatest width of the fastening tab 32.

The width of apertures 28 and 29 is not constant. Instead, the apertures widen as they extend toward leading end 24. To provide proper connection between the belt links 20, the apertures are narrower than the fastening tab width so that the fastening tab 32 cannot pass back through the apertures once the belt links are connected. However, the apertures are wider than the neck 33 to allow the neck to extend through the apertures while the belt links are connected, as will be discussed below.

The belt links 20 are made of a material of sufficient tensile strength to convey the weight of the workpiece 14 or transmit the necessary power, if used in a power transmission application. In the preferred embodiment, the belt links 20 are made of a thermoset urethane that is reinforced with a polyester fabric.

Because the belt links have sufficient tensile strength to convey the weight of the workpiece 14, the tensile strength of the material used to make the top layer 40 can be a secondary consideration. The smoothing layer 40 is preferably formed as a separate element that is attached to the surface of the belt. Referring to FIGS. 2-3, in the present instance the smoothing layer 40 is a thin layer of material similar to the material from which the belt links are formed. For instance, the smoothing layer may be formed of polyester fabric reinforced thermoset urethane that is less than ½ the thickness of the material from which the belt links 20 are formed.

As previously stated, the assembly 10 comprises an interlocking-link belt 15 having a smoothing layer 40, which is comprised of a plurality of belt links 20 that have been described above. The following discussion describes the interconnections between the belt links 20 that form the belt 15.

As shown in FIGS. 3 and 4, a series of belt links 20 are arranged in a superimposed successive overlapping relation to form the belt 15 with a bonding surface 35. The bottom surface 39 of each belt link overlaps the top surface 38 of an adjoining belt link, so that the thickness of the belt 15 is at least twice the thickness of an individual belt link 20.

FIGS. 2 and 6 illustrate a portion of the assembly 10, showing how the bonding layers 35 of the belt links combine to form a bonding surface when the belt links are interconnected. Included in these views is the connection between a belt link 20C, and the two preceding belt links, 20B, and 20A. In this connection, the fastening tab 32A of belt link 20A passes sideways through apertures in the two trailing belt links. It first passes through the trailing aperture 28B of the adjacent trailing belt link 20B and then passes through the leading aperture 29C of the next trailing belt link 20C.

The term preceding is used with respect to the direction the assembly travels, as shown in by the arrows in FIGS. 1 and 2. Because the direction of travel can be reversed, the preceding belt links can be succeeding with respect to the actual travel of the assembly 10.

After passing through the aperture in belt link 20C, the belt link fastening tab 32A is twisted to bear against the bottom surface of belt link 20C. When connected in this way, the top surface of belt link 20A is the top side 11 of belt 15, and the bottom surface of belt link 20C is the bottom side 12 of belt 15.

The belt 15 is produced as follows. The belt links 20 that make up the belt 15 include at least one layer of reinforcing material, such as woven polyester sheet. The reinforcing material is impregnated with a binding material to form a composite material. The binding material is liquified and deposited onto the reinforcing material while liquid. Preferably, the composite material includes a plurality of layers of reinforcing material and the binding material is a thermoset urethane.

A bonding material is deposited on the composite material, preferably while the binding material is wet. In other words, preferably the bonding material is deposited on the composite material before the composite material is cured or dried. The bonding material may be sprayed on, poured on or the composite material may be partially submerged in a bath of bonding material. The bonding material may be a chemical adhesive, such as an epoxy. However, preferably the bonding material is a film of thermoplastic urethane that is approximately coextensive with the upper surface of the composite material. Since the binding material of the composite material is wet when the film is placed on the composite material, the film adheres to the composite material.

After the bonding material is deposited on the composite material, the combination is cured. During the curing process the layer of bonding material permanently bonds to the composite material.

Ordinarily the cured material is at least several times wider that the width of the belt links 20. The cured material is therefore cut into a plurality of elongated strips approximately as wide as the width of a belt link 20. The belt links are then cut-out from the strips of cured material. In the present instance, the belt links are formed by punching, which also simultaneously punches the rearward and forward apertures in the belt links.

Formed in this way, the belt links 20 have an integral bonding surface approximately 1 mm thick forming the top surface 38 of the belt link. The bonding surface is coextensive with the substrate material forming the belt link 20 which in the present instance is polyester reinforced thermoset urethane.

The belt links 20 are assembled to form a continuous interlocking link belt 15. The belt links 20 are connected to one another as detailed above and shown in FIGS. 2 and 3. Preferably, the assembled belt is then trimmed by cutting the edges of the belt to form beveled edges that engage the sheaves of the pulleys about which the conveyor assembly 10 travels.

Referring to FIGS. 2 and 3, the details of the smoothing layer will be described in greater detail. The smoothing layer 40 may be formed of one or more generally flat flexible elements that extend along part or all of the length of the link belt 15. In the illustrated embodiment, the smoothing layer 40 is formed of a series of substantially flat elements positioned end to end along the length of the belt to form a generally continuous top layer for the conveyor assembly 10.

As discussed previously, the smoothing elements 42 may be formed of polyester fabric reinforced thermoset urethane similar to the material used to form the links. Like the belt link material, the material for the smoothing elements may include a layer of thermoplastic urethane. In this way, the bottom surface of each smoothing element has a layer of thermoplastic urethane that is used to thermally weld the smoothing element to the link belt 15. Further, in certain applications it may be desirable to have a high friction top surface. Therefore, the top surface of the smoothing elements may also be a layer of thermoplastic urethane. In either instance, preferably the smoothing element is relatively thin, having a thickness of approximately 2 mm. By using a relatively thin and flexible layer, the overall thickness of the belt does not get too large to readily fit within standard drive elements such as sheaves. However, in certain applications it may be desirable to utilize a top element having a greater thickness.

Each smoothing element 42 may be elongated so that each element overlies the exposed upper surface of numerous belt links 20. However, in the present instance, the smoothing elements overlie portions of two belt links and each smoothing element is attached to a single belt link. Specifically, as shown in FIG. 2, each smoothing element is attached to the protrusion formed at the intersection between two adjacent links.

As shown in FIG. 2, at the position where the neck 33B of the belt link curves downwardly through the trailing belt link, a step is formed by the rearward edge of the belt link, creating an abrupt transition from the surface of the leading belt link 20B to the surface of the next belt link 20C. The smoothing elements overlie these abrupt transitions between the links, substantially eliminating the transitions between the links to provide a generally continuous smooth upper surface.

In the present embodiment, each smoothing element 42 is attached to a single belt link adjacent the rearward end of the body portion of the belt link, as shown in FIGS. 2, 4 and 5. The rearward edge of the smoothing element projects forwardly over the body of the trailing belt link. The forward edge of the smoothing element terminates prior to the intersection of the belt link 20B with the preceding belt link 20A. Preferably each smoothing link is attached in a similar manner to form a series of smoothing elements with the leading edge of a smoothing element being adjacent the trailing edge of the smoothing element attached to the adjacent leading belt link.

The smoothing elements 42 may be individually formed and attached to the belt links before or after the belt links are combined to form the link belt 15. In the present instance, the smoothing elements are attached to the belt 15 after the belt is formed, but before the ends of the belt are connected to form a continuous loop. More specifically, as described further below, the smoothing elements are formed from an elongated section of the smoothing layer that is attached to the top surface of the belt and then severed to form the separate smoothing elements.

A number of belt links are assembled together to form a length of belt, without connecting the ends to form a continuous belt. An elongated strip of top layer material is adhered to the top of the length of assembled belt links. In the present instance, the length of the top layer material is sufficient to overlie the entire length of assembled belt links.

The top layer material may be adhered to the top of the belt by various methods, such as by mechanical fastener, or chemical adhesive, such as epoxy. However, as described previously, in the present embodiment, the top layer material is thermally welded to the belt links. To attach the smoothing layer 40, the smoothing layer is placed on top of the belt. Heat is then applied to the smoothing layer and the bonding surface to fuse the top layer and bonding surface together. In other words, heat is applied so that the thin layer of urethane on the top surface of the belt melts together with the thin layer of urethane on the bottom surface of the smoothing layer 40.

Although the entire length of the belt 15 and the top layer 40 may be heated to weld the entire length of the top layer, in the present instance, the length of the top layer is progressively welded to the belt. A portion of the length of link belt is advanced through an oven along with a corresponding portion of the length of top layer material. The link belt and top layer enter the oven at one end as separate items, and are discharged from the oven at a second end after the link belt and top layer are heated in the oven to weld the items together. As the welded belt assembly is pulled through the discharge end of the oven, a trailing portion of the top layer and link belt enter the oven and are welded together. In this way the top layer is progressively welded to the length of the belt.

After the top layer 40 is attached to the link belt, the ends of the link belt are attached to form a continuous belt. In some applications it may be desirable to utilize the belt with a continuous unitary top layer. However, typically it is desirable to separate the top layer into a series of smoothing elements. In this way, the belt can be disconnected at various positions along the length of the belt without having to sever the belt at that time.

Accordingly, preferably, after the top layer is adhered to the link belt, the top layer is severed at a plurality of points along the length of the belt. More preferably, referring to FIGS. 2 and 6, the top layer 40 forms a bridge that extends from the front edge of the body of a belt link to the front edge of the body of the preceding belt link. The top layer is attached to the belt links at the front edge of each link, however, there is a gap 45 between the top edge of the belt and the top surface in between the attachment points. At a point where there is a gap 45, the top layer is cut across the width and thickness of the top layer. Further, by cutting the top layer at each of the gaps, the top layer is cut into a series of separate elements, with each element being attached to a single belt link. In this way, any belt link can be detached from an adjacent belt link and replaced as necessary.

Although in the preferred embodiment, the belt is a link belt with links connected by tabs, the present invention is broad enough to include other types of belts. For instance, other types of link belts can be used, such as a riveted link belt in which the overlapping links are riveted to each other.

In addition, although the top layer has been described as a thin layer of reinforced thermoset urethane, the invention is not limited to the particular type of top layer. For instance, the top layer may be relatively thick or it may be formed from various materials, such as fiber reinforced, metal reinforced or foamed thermoplastic urethane. Additionally, although the bonding surface 35 and top layer 40 include a thermoplastic urethane, the elements can be formed from other materials. However, it is desirable that the materials be selected to ensure a consistent secure bond between the belt and the top layer. Preferably, the bond is provided by thermally bonding the belt 15 and the top layer 40 as described above, so the materials should be selected to provide a consistent secure thermal bond. In other instances however, it may be desirable to use a chemical adhesive as a primary or secondary bond between the top layer and the belt. If a chemical adhesive is used as a primary bond, it is possible to eliminate the thermal bond between the two layers. If the chemical adhesive is used as a secondary bond, preferably the chemical adhesive provides additional support to the thermal bond. If a chemical adhesive is used as a primary or secondary bond, the bonding surface and top layer should be formed of materials that can be securely connected by the chemical adhesive.

The terms and expressions which have been employed are used as terms of description and not of limitation. For instance, as described above, the bonding layer for the link belt is created by forming a the bonding layer on the material used to create each link. Alternatively, the bonding layer may be applied to each belt link after each link is formed, such as by coating the links with thermoplastic urethane or another suitable material. Yet another alternative is to apply the bonding material to the surface of the link belt after the links are connected together. There is no intention in the use of such terms and expressions of excluding any equivalents of the features shown and described or portions thereof. It is recognized, however, that various modifications are possible within the scope of the invention as claimed.

That which is claimed is:

1. A method for producing a belt, comprising the steps of:
providing a link belt formed of a plurality of individual belt links;
attaching a top layer to the top surface of the link belt; and
severing the top layer after attaching the top layer to the link belt, to provide a plurality of separate top layer elements attached to the top surface of the link belt.

2. The method of claim 1 wherein the step of attaching a top layer comprises thermally welding the top layer to the top surface of the link belt.

3. The method of claim 1 wherein the step of severing comprises cutting through the top layer at a plurality of locations along the length of the top layer.

4. The method of claim 1 wherein the step of severing comprises severing the top layer so that each top layer element is attached to the top surface of no more than three belt links.

5. The method of claim 4 wherein the step of severing comprises severing the top layer so that each top layer element is attached to the top surface of no more than one belt link.

6. The method of claim 1 comprising the step of disconnecting adjacent belt links without detaching the top layer from the belt links.

7. The method of claim 1 wherein the step of providing a link belt comprises the steps of:
providing a plurality of belt links each having a fastening tab and an aperture; and
securing the belt links together in overlapping relation by extending the tab of each belt link through the aperture in an adjacent belt link.

8. The method of claim 1 wherein the step of attaching a top layer comprises attaching a top layer such that the top layer overlies substantially the entire length of link belt.

9. The method of claim 1 comprising the step of providing a top layer comprising a layer of fabric.

10. The method of claim 1 wherein the link belt comprises a plurality of intersecting belt links wherein a protrusion is formed at the intersection between adjacent belt links, thereby forming a plurality of protrusions along the length of the belt, wherein the method comprises the step of selecting a top element configured to provide a plurality of smoothing elements, and wherein the step of attaching the top layer to the link belt comprises attaching the top element such that the top element overlies the plurality of protrusions to provide a smooth upper surface.

11. A method for producing a belt, comprising the steps of:
forming a belt having a top layer of heat fusible material;
providing a top element configured to overlie a length of the belt;
adhering the bottom surface of the top element to the top layer of the belt,
wherein the step of adhering comprises heat fusing the top element and the belt; and
severing the top element at a plurality of positions along the length of the belt after the top element is attached to the belt.

12. The method of claim 11 wherein the step of severing comprises cutting through the top layer at a plurality of locations along the length of the top layer.

13. The method of claim 11 wherein the step of severing comprises severing the top layer so that each top layer element is attached to the top surface of no more than three belt links.

14. The method of claim 13 wherein the step of severing comprises severing the top layer so that each top layer element is attached to the top surface of no more than one belt link.

15. The method of claim 14 wherein the step of providing a belt comprises the steps of:
providing a plurality of belt links each having a fastening tab and an aperture; and
securing the belt links together in overlapping relation by extending the tab of each belt link through the aperture in an adjacent belt link.

16. The method of claim 14 wherein the step of attaching a top element comprises attaching a top element such that the top element overlies substantially the entire length of belt.

17. The method of claim 15 wherein the step of providing a top element comprises the step of providing a top element comprising a layer of fabric.

18. The method of claim 10 wherein the step of severing the top element comprises severing the top element to form a plurality or smoothing elements wherein each smoothing element overlies one of the protrusions without overlapping a preceding or successive protrusion.

* * * * *

UNITED STATES PATENT AND TRADEMARK OFFICE
CERTIFICATE OF CORRECTION

| | |
|---|---|
| PATENT NO. | : 7,449,079 B2 |
| APPLICATION NO. | : 11/277301 |
| DATED | : November 11, 2008 |
| INVENTOR(S) | : Francis Fatato et al. |

It is certified that error appears in the above-identified patent and that said Letters Patent is hereby corrected as shown below:

Col. 10, Claim 18, line 1, "plurality or smoothing" should read -- plurality of smoothing --

Signed and Sealed this

Seventeenth Day of March, 2009

JOHN DOLL
*Acting Director of the United States Patent and Trademark Office*